United States Patent
Jha (10) Patent No.: US 10,356,665 B2
(45) Date of Patent: *Jul. 16, 2019

(54) SOURCE BASE STATION GATEWAY (GW) FOR RELEASING RESOURCES ASSOCIATED WITH A MOBILE DEVICE

(71) Applicant: NEC CORPORATION, Tokyo (JP)

(72) Inventor: Vivek Jha, Bangalore (IN)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,366

(22) Filed: May 24, 2018

(65) Prior Publication Data

US 2018/0376379 A1   Dec. 27, 2018

Related U.S. Application Data

(63) Continuation of application No. 15/495,000, filed on Apr. 24, 2017, now Pat. No. 10,009,798, which is a
(Continued)

(30) Foreign Application Priority Data

Feb. 18, 2011   (GB) .................................. 1102883.4

(51) Int. Cl.
*H04W 36/38* (2009.01)
*H04W 36/04* (2009.01)
(Continued)

(52) U.S. Cl.
CPC ....... *H04W 36/0005* (2013.01); *H04W 36/08* (2013.01); *H04W 60/00* (2013.01);
(Continued)

(58) Field of Classification Search
CPC ............. H04W 76/36; H04W 36/0005; H04W 84/045; H04W 76/34; H04W 36/08;
(Continued)

(56) References Cited

U.S. PATENT DOCUMENTS 8,228,871 B2   7/2012   Johansson et al.
8,311,544 B2   11/2012  Zhou
(Continued)

FOREIGN PATENT DOCUMENTS

CN   101778474 A   7/2010
EP   2148537 A1    1/2010
(Continued)

OTHER PUBLICATIONS

3GPP TS 36.300, Technical Specification, 3rd Generation Partnership Project; Technical Specification Group Radio Access Network; "Evolved Universal Terrestrial Radio Access (E-UTRA) and Evolved Universal Terrestrial Radio Access Network (E-UTRAN); Overall description Stage 2" (Release 9), V9.6.0(Dec. 2010).
(Continued)

*Primary Examiner* — Meless N Zewdu
(74) *Attorney, Agent, or Firm* — Sughrue Mion, PLLC (57) ABSTRACT

A communication system is described in which a handover procedure is provided to allow a mobile device to transfer from a home base station connected to a core network via a home base station gateway to another base station not coupled via the home base station gateway. A novel extension to the handover procedure is provided in which the home base station gateway is informed of the transfer of the mobile device, allowing context and resources assigned to the mobile device at the base station gateway to be released.

2 Claims, 8 Drawing Sheets

Related U.S. Application Data continuation of application No. 13/818,090, filed as application No. PCT/JP2012/054177 on Feb. 15, 2012, now Pat. No. 9,668,181.

(51) Int. Cl.
*H04W 92/12* (2009.01)
*H04W 36/00* (2009.01)
*H04W 76/36* (2018.01)
*H04W 84/04* (2009.01)
*H04W 36/08* (2009.01)
*H04W 60/00* (2009.01)
*H04W 60/04* (2009.01)
*H04W 76/34* (2018.01)

(52) U.S. Cl.
CPC .......... *H04W 60/04* (2013.01); *H04W 76/36* (2018.02); *H04W 84/045* (2013.01); *H04W 92/12* (2013.01); *H04W 76/34* (2018.02)

(58) Field of Classification Search
CPC ..... H04W 60/00; H04W 60/04; H04W 92/12; H04W 36/00; H04W 76/06; H04W 84/04; H04W 36/0016; H04W 76/30; H04W 76/32; H04W 36/18
See application file for complete search history.

(56) References Cited

U.S. PATENT DOCUMENTS

| | | | |
|---|---|---|---|
| 8,504,055 B2 | 8/2013 | Vikberg et al. | |
| 8,520,636 B2 | 8/2013 | Xu | |
| 8,638,750 B2* | 1/2014 | Wu | H04L 47/80 370/331 |
| 9,642,045 B2 | 5/2017 | Zhang et al. | |
| 9,668,181 B2* | 5/2017 | Jha | H04W 76/36 |
| 10,009,798 B2* | 6/2018 | Jha | H04W 76/36 |
| 2007/0086383 A1* | 4/2007 | Watanabe et al. | 370/331 |
| 2009/0239538 A1* | 9/2009 | Motegi | H04W 36/02 455/436 |
| 2009/0245204 A1* | 10/2009 | Voyer | H04W 36/18 370/331 |
| 2009/0257402 A1* | 10/2009 | Zhu | H04W 36/08 370/331 |
| 2010/0008293 A1 | 1/2010 | Gupta et al. | |
| 2010/0035617 A1 | 2/2010 | Whinnett | |
| 2010/0093358 A1 | 4/2010 | Cheong et al. | |
| 2010/0150049 A1 | 6/2010 | Kim et al. | |
| 2010/0227621 A1* | 9/2010 | Wu | H04L 47/745 455/450 |
| 2010/0238900 A1 | 9/2010 | Johansson et al. | |
| 2010/0238920 A1 | 9/2010 | Salkintzis et al. | |
| 2010/0330993 A1 | 12/2010 | Kone | |
| 2011/0013593 A1* | 1/2011 | Hapsari | H04W 36/02 370/331 |
| 2011/0045823 A1 | 2/2011 | Wang et al. | |
| 2011/0070889 A1 | 3/2011 | Li | |
| 2011/0080891 A1* | 4/2011 | Cai | H04W 36/0033 370/331 |
| 2011/0171963 A1 | 7/2011 | Zhou | |
| 2011/0223919 A1* | 9/2011 | Vikberg | H04W 36/08 455/436 |
| 2011/0274086 A1* | 11/2011 | Xu | 370/331 |
| 2011/0286429 A1* | 11/2011 | Vikberg | H04W 36/0005 370/331 |
| 2011/0300867 A1 | 12/2011 | Matsuo et al. | |
| 2012/0046058 A1 | 2/2012 | Vesterinen et al. | |
| 2012/0129525 A1 | 5/2012 | Pazhyannur et al. | |
| 2012/0188984 A1 | 7/2012 | Takahashi et al. | |
| 2012/0196594 A1 | 8/2012 | Abhishek et al. | |
| 2012/0287905 A1 | 11/2012 | Johansson et al. | |
| 2013/0003648 A1* | 1/2013 | Hahn | H04W 36/0005 370/315 |
| 2013/0035097 A1 | 2/2013 | Zhou | |
| 2014/0010204 A1 | 1/2014 | Xu et al. | |
| 2015/0172964 A1 | 6/2015 | Huang et al. | |

FOREIGN PATENT DOCUMENTS

| | | |
|---|---|---|
| EP | 2334128 A1 | 6/2011 |
| WO | 2009/0057732 A1 | 5/2009 |
| WO | 2010006203 A2 | 1/2010 |
| WO | 2010059099 A1 | 5/2010 |
| WO | 2010107353 A1 | 9/2010 |
| WO | 2011060745 A1 | 5/2011 |

OTHER PUBLICATIONS

3GPP TS 36.413, Technical Specification, 3rd Generation Partnership Project; Technical Specification Group Radio Access Network; "Evolved Universal Terrestrial Radio Access Network (E-UTRAN); S1 Application Protocol (S1AP)", (Release 10), V10.0. (Jan. 2011).
3GPP TSG-RAN3 Meeting #706, Dublin, Ireland, Jan. 17-21, 2011, R3-110108, UE Context Release in the source of HeNB GW.
Huawei et al: "Further considerations on the UE context release in the source HeNB GW after X2 handover", 3GPP Draft; R3-110627 UE Context Release, 3rd Generation Partnership Project (3GPP), Mobile Competence Centre, 650, Route Des Lucioles , F-06921 Sophia-Antipous Cedex , France, vol. RAN WG3, No. Taipei, Taiwan; Feb. 21, 2011, Feb. 14, 2011 (Feb. 14, 2011),XP050497504.
Huawei: Discussion on UE context release in the source HeNB GW for X2 mobility, 3GPP Draft; R3-110107 Disc UE Context Release,3rd Generation Partnership Project (3GPP), Mobile Competence Centre; 650, Route Des Lucioles ; F-06921 Sophia-Antipolis Cedex ; France, vol. RAN WG3 No. Dublin, Ireland; Jan. 17, 2011, Jan. 11, 2011 (Jan. 11, 2011), XP050497134, p. 1, paragraph 1-p. 2, paragraph 2.1.
International Search Report in PCT/JP2012/054177 dated Jul. 12, 2012 (English Translation Thereof).
Extended European Search Report dated Mar. 14, 2019 issued by the European Patent Office in counterpart application No. 19151517.0.

* cited by examiner

SOURCE BASE STATION GATEWAY (GW) FOR RELEASING RESOURCES ASSOCIATED WITH A MOBILE DEVICE

TECHNICAL FIELD

The present invention relates to mobile telecommunication networks, particularly but not exclusively networks operating according to the 3$^{rd}$ Generation Partnership Project (3GPP) standards or equivalents or derivatives thereof. The invention has particular although not exclusive relevance to the management of the handover of a mobile device from one base station to another.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the (Long Term Evolution) LTE standards, the HNB is sometimes referred to as a HeNB. A similar architecture will also be applied in the WiMAX network. In this case, the home base station is commonly referred to as a femto cell. For simplicity, the present application will use the term HeNB to refer to any such home base station and will use the term NodeB generically to refer to other base stations (such as the base station for the macro cell in which a HeNB operates). The HeNB will provide radio coverage (for example, 3G/4G/WiMAX) within the home, small and medium enterprise, shopping Malls etc and will connect to the core network via a suitable public network (for example via an ADSL link to the Internet) or operator network and in the case of the 3GPP standards, via an optional HeNB gateway (HeNB-GW) which typically will aggregate traffic from several HeNBs.

For a HeNB connected behind a HeNB gateway, two pairs of mobile telephone associated connections are established, one between the HeNB and the HeNB gateway, and another between the HeNB gateway and the mobile management entity (MME) within the core network. Mapping between the two contexts associated with a specific mobile telephone is performed by the HeNB gateway, and therefore for a single mobile telephone connected to a HeNB behind a HeNB gateway, context and resources are allocated at both the HeNB and the HeNB gateway.

In common with other NodeBs, HeNBs are able to communicate with each other (and other NodeBs) using the X2 interface. In particular, HeNBs are able to coordinate a handover process between source and target base stations using the X2 interface without overall control by the core network. During an X2 based handover between two HeNBs, the target HeNB explicitly releases the UE context at the source HeNB using the X2AP UE Context Release procedure. However, as the X2 interface is used to coordinate the handover, for a source HeNB behind a HeNB gateway, no message relating to release of the UE context traverses through the HeNB gateway, and therefore the HeNB gateway does not have any means to understand the mobile telephone has been handed over via an X2 based handover to the target HeNB.

SUMMARY OF THE INVENTION

Thus, according to the present handover processes, whenever an X2 based handover takes place where a source HeNB is behind a HeNB gateway, and the target HeNB is not behind the same HeNB gateway, the UE context and related resources assigned by the HeNB gateway to the mobile telephone will not be released. Thus, there exists a need to adapt the current processes to overcome this problem.

Although for efficiency of understanding for those of skill in the art, the invention will be described in detail in the context of a 3G system (UMTS, LTE), the principles of the invention can be applied to other systems (such as WiMAX) in which mobile telephones or User Equipment (UE) communicate with one of several base stations with the corresponding elements of the system changed as required.

Accordingly, preferred embodiments of the present invention aim to provide methods and apparatus which overcome or at least alleviate the above issues.

According to a first aspect of the invention, there is provided a base station for communicating with a plurality of mobile devices and coupled to a core network via a home base station gateway, the base station comprising a connection management module configured to perform a handover process and comprising means for transferring a communication link associated with a mobile device from the base station to another base station, the other base station coupled to the core network other than via the home base station gateway; means for receiving a message from the other base station indicating that handover has been completed, and means operable in response to receiving the message indicating that handover has been completed to send an indication to the home base station gateway that the mobile station is no longer coupled to the base station.

The base station may comprise a home base station, for example a HeNB, and the home base station gateway may comprise a HeNB gateway for connecting the HeNB to the core network.

The means for transferring a communication link to another base station may comprise means for transferring the communication link to a further home base station, or further HeNB. The further HeNB may be coupled to the core network via a different home base station gateway, or HeNB gate way.

The means for transferring a communication link to another base station may further comprise means for transferring the communication link to a macro cell associated with the other base station, for example an eNB.

The handover process may comprise a X2 based handover procedure, and the message indicating that handover has been completed may comprise a X2 UE Context Release message.

According to a further aspect of the invention, there is provided a method of facilitating handover in a communications network, the method comprising performing a handover of a mobile device from a source base station coupled to a core network via a base station gateway to a target base station coupled to the core network other than via the base station gateway, receiving a message from the target base station indicating that handover has been completed, and in response to receiving the message indicating that handover has been completed, sending an indication to the base station gateway that the mobile station is no longer coupled to the base station.

According to a further aspect of the invention, there is provided a home base station gateway for communicating with a plurality of base stations and coupled to a core network, the base station gateway comprising a mobile telephone registration module configured to receive an indication from a base station coupled to the base station gateway that a communication link associated with a mobile device has been transferred from the base station to a further base station and further configured to release a context associated with the mobile device in response to receiving the indication.

The further base station is not coupled to the core network via the base station gateway, for example the further base station may be directly coupled to the core network or may be coupled via a different home base station gateway.

The transfer of the communication link may comprise an X2 based handover procedure. The base station may be a home base station, such as a HeNB.

According to a further aspect of the invention, there is provided a method of facilitating handover in a communications network, the method comprising receiving at a base station gateway an indication from a base station coupled to the base station gateway that a communication link associated with a mobile device has been transferred from the base station to a further base station, and in response to receiving the indication, releasing a context associated with the mobile station.

According to a further aspect of the invention, there is provided a home base station gateway for communicating with a plurality of base stations and coupled to a core network, the base station gateway comprising a mobile telephone registration module configured to identify a path switch request from a base station, the path switch request associated with a communication link transferred to the base station, the mobile telephone registration module further configured to assign a context to a mobile device associated with the communication link in response to identifying the path switch request.

The base station may be a home base station such as an HeNB, and may be coupled to the core network via the base station gateway. The transfer of the communication link to the base station may comprise an X2 based handover procedure.

According to a further aspect of the invention, there is provided a base station for communicating with a plurality of mobile devices and coupled to a core network via a home base station gateway, the base station comprising a connection management module configured to perform a handover process comprising: transferring a communication link associated with a mobile device to the base station from another base station, the other base station coupled to the core network other than via the home base station gateway, the handover process further comprising receiving a message from the other base station providing information identifying the mobile device, and storing the information identifying the mobile device at the base station.

The base station may comprise a home base station, for example a HeNB. The transfer of the communication link may comprise an X2 based handover procedure.

The information identifying the mobile device comprises an MME UE S1AP ID value.

According to a further aspect of the invention, there is provided a user equipment adapted to operate with a base station as described above.

According to a further aspect of the invention, there is provide a computer program product comprising computer program code configured to perform any of the above described methods.

According to a further aspect of the invention, there is provided a base station for communicating with a plurality of mobile devices and coupled to a core network via a home base station gateway, the base station comprising a connection management module configured to perform a handover process comprising transferring a communication link associated with a mobile device from the base station to another base station, the other base station coupled to the core network other than via the home base station gateway, the handover process further comprising receiving a message from the other base station indicating that handover has been completed, and in response to receiving the message indicating that handover has been completed sending an indication to the home base station gateway that the mobile station is no longer coupled to the base station.

According to a further aspect of the invention, there is provided a base station for communicating with a plurality of mobile devices and coupled to a core network via a home base station gateway, the base station comprising a connection management module configured to perform a handover process and comprising means for transferring a communication link associated with a mobile device to the base station from another base station, the other base station coupled to the core network other than via the home base station gateway; means for receiving a message from the other base station providing information identifying the mobile device, and means for storing the information identifying the mobile device at the base station.

BRIEF DESCRIPTION OF THE DRAWINGS

Embodiments of the invention will now be described, by way of example, with reference to the accompanying drawings in which.

DETAILED DESCRIPTION OF EXEMPLARY EMBODIMENTS

Overview

Figure 1:
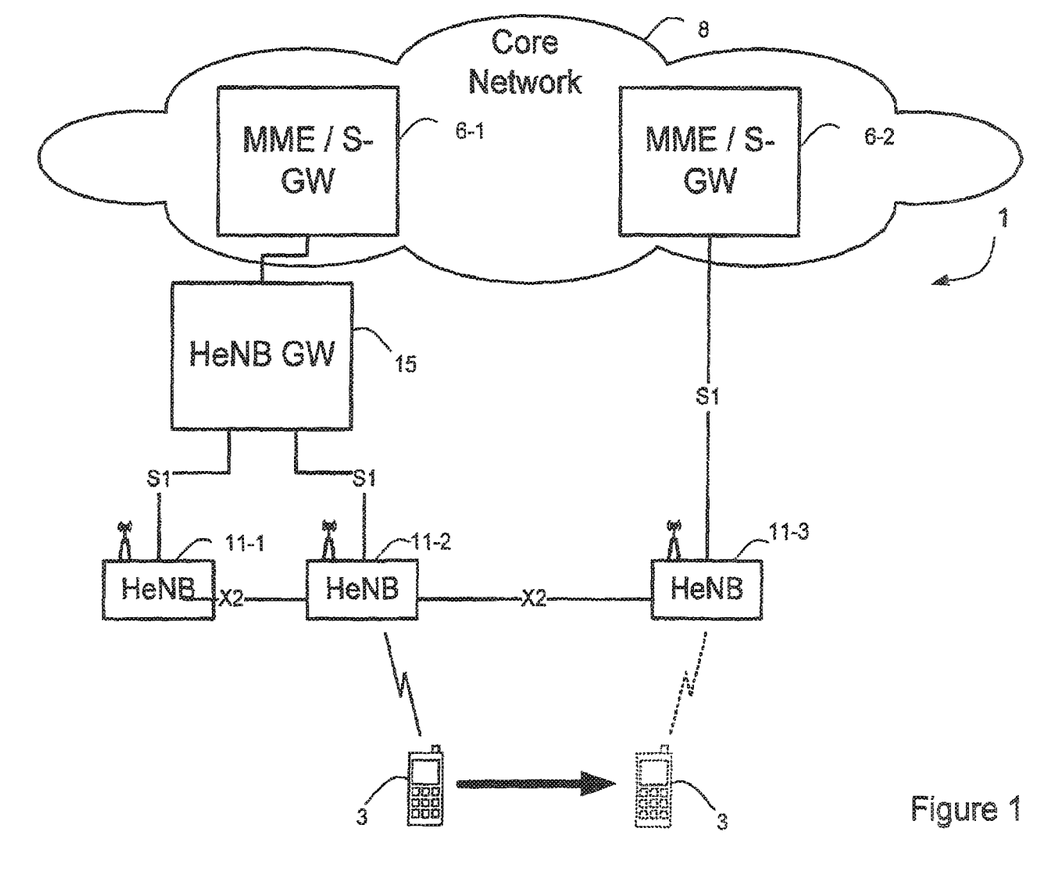
FIG. 1 schematically illustrates a mobile telecommunication system.

FIG. 1 schematically illustrates a mobile (cellular) telecommunication system 1 in which a user of a mobile telephone 3 can communicate with other users (not shown) via a 'home' base station (HeNB) 11-1, which he may be permitted to access. The HeNB 11-1 is coupled via a home base station gateway (HeNB-GW) 15, to the core telephone network 8 including mobile management entity/serving gateway (MME/S-GW) 6-1. In the telecommunication system 1 the user may also communicate with the other users (not shown) via an HeNB 11-2 which, in this example, is also coupled via the same home base station gateway (HeNB-GW) 15, to the mobile management entity/serving gateway 6-1.

In the example of FIG. 1, the HeNBs 11-1 and 11-2 connect to a common HeNB-GW 15 via a suitable network connection such as an ADSL or cable connection providing an Internet connection and are programmed with the IP address of the HeNB-GW 15 so that all uplink communications are transmitted via HeNB-GW 15. HeNB 11-3 provides a further cell area in which a user may connect via HeNB 11-3 and a suitable internet connection such as an ADSL or cable connection to a mobile management entity/serving gateway 6-2 without connecting to HeNB-GW 15. It is noted that while HeNB 11-3 is shown as connecting to a different MME/S-GW 6-2 than HeNBs 11-1 and 11-2, HeNB 11-3 could connect to the same MME/S-GW 6-1 without connecting via HeNB GW 15.

Figure 6:
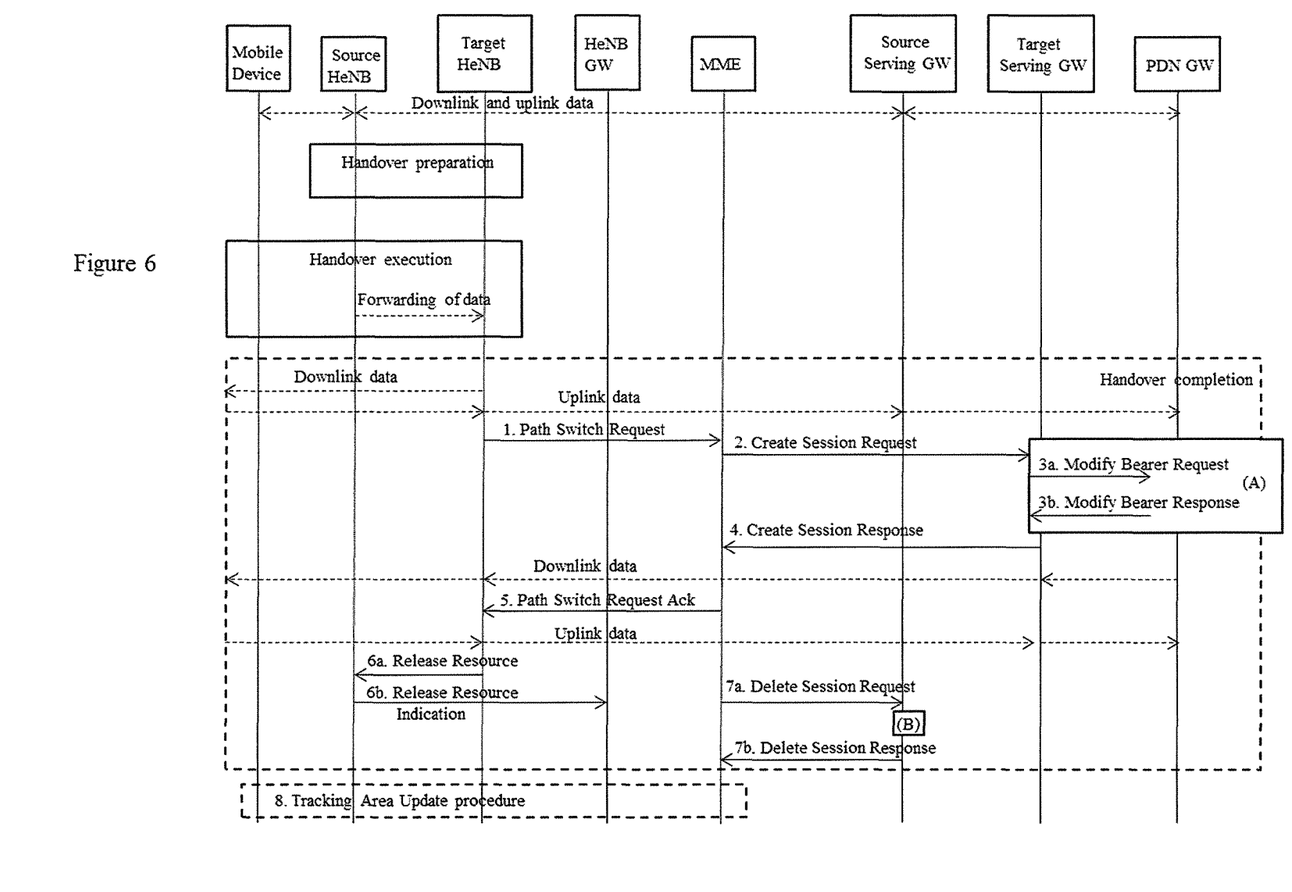
FIG. 6 is a timing diagram indicating a handover procedure by which communication with a mobile telephone is transferred between a source and target home base station served by different serving gateways in the core network.

As is well known, a mobile telephone 3 may be transferred from a cell associated with a first HeNB 11-2 to a second cell associated with a second HeNB 11-3. The process of performing the handover HO is illustrated schematically in FIG. 1 and described in more detail below with reference to FIG. 6. The MME 6-1, and/or MME 6-2, keeps track of mobile devices and their connections to the base stations as they move through the network in a database of Mobility Management Entity (MME) and Evolved Packet System (EPS) bearer contexts.

Figure 2A:
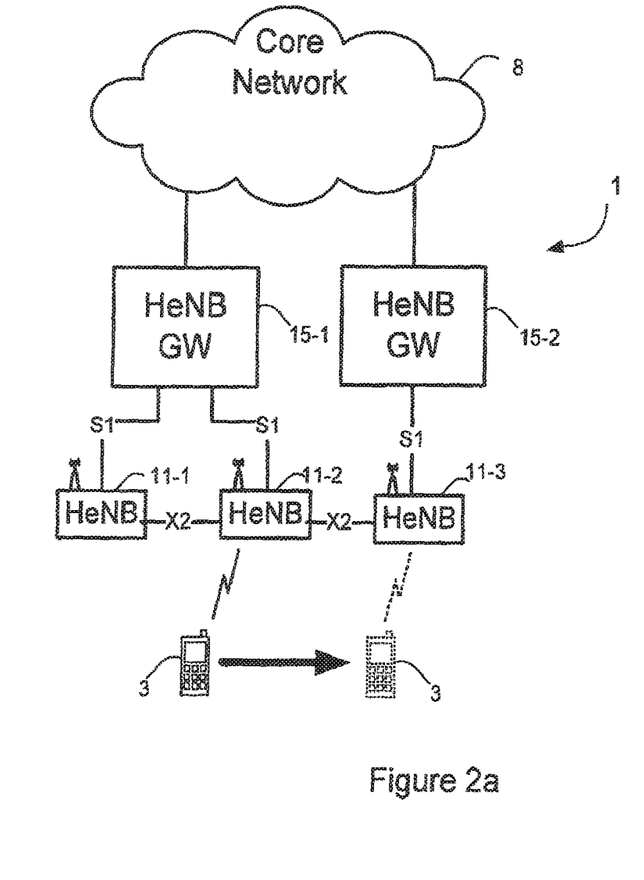
FIGS. 2a and 2b schematically illustrate hand over scenarios in the mobile telecommunication system of FIG. 1.
Figure 2B:
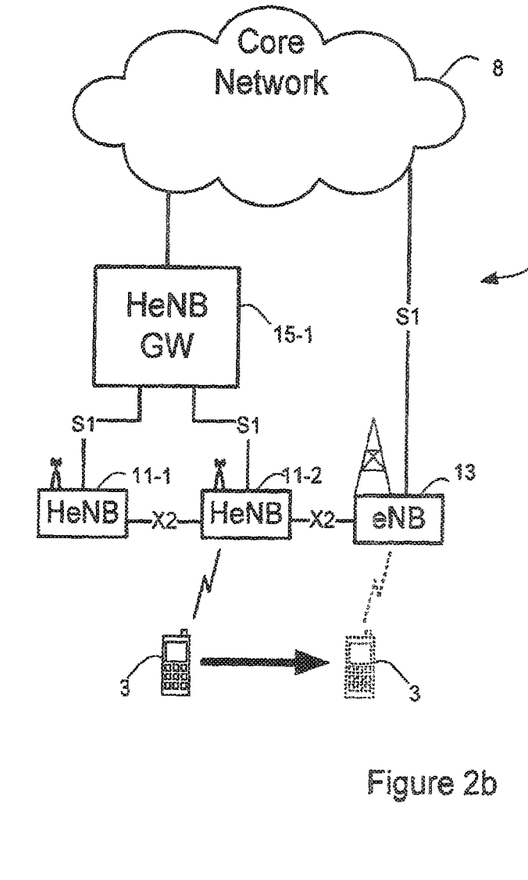

FIGS. 2a and 2b show further handover scenarios in which context and resources allocated to a mobile station at the HeNB gateway 15 may not be released after an X2 based handover of the mobile station 3.

In the scenario illustrated in FIG. 2a, mobile telephone 3 is transferred from a cell associated with source HeNB 11-2 to target HeNB 11-3. In this case, source HeNB 11-2 is coupled to the core network 8 via a first HeNB GW 15-1, while target HeNB 11-3 is connected to the core network 8 via HeNB GW 15-2.

The scenario illustrated in FIG. 2b is similar to the handover scenario of FIG. 1, except that the target base station comprises eNB 13, rather than a further HeNB. Some implementations of the telecommunication network 1 may allow such handovers to take place, and in such implementations the problem addressed by embodiments of the invention will manifest.

In each of the handover scenarios illustrated in FIGS. 1, 2a and 2b, embodiments of the invention provide a method of facilitating release of context and resources assigned to a mobile telephone 3 at the HeNB gateway 15-1 when an X2 based handover procedure is used to handover mobile telephone from a source HeNB coupled to the core network 8 via the HeNB gateway 15-1 to a target base station that is not coupled via the same HeNB gateway 15-1.

As will be recognized by the skilled person, core network 8 may include many other entities and modules required to provide the communication network 1, which have not been shown in the figures to aid clarity. Such entities include the packet data network (PDN) gateway for routing packet data to a mobile device.

Home Base Station (HeNB)

Figure 3:
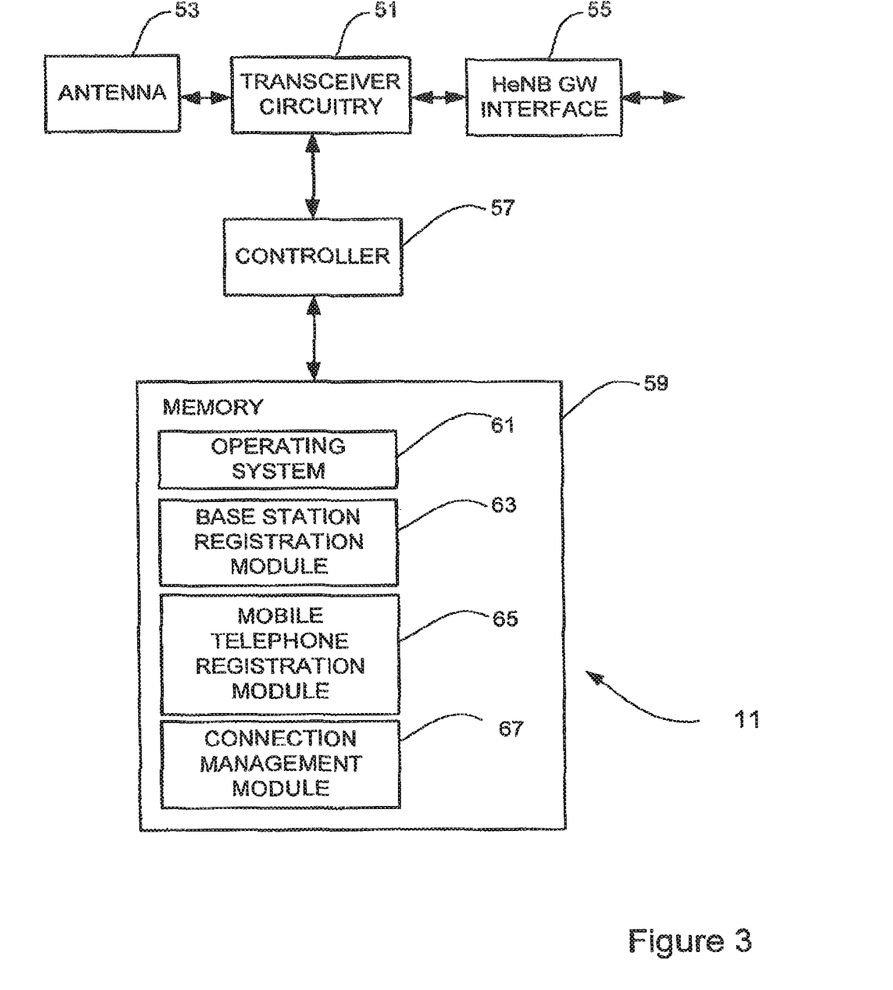
FIG. 3 is a block diagram of a home eNB forming part of the system shown in FIG. 1.

FIG. 3 is a block diagram illustrating the main components of one of the home base stations (HeNB) 11 shown in FIG. 1. As shown, the HeNB 11 includes transceiver circuitry 51 which is operable to transmit signals to, and to receive signals from, the mobile telephone 3 via one or more antennae 53 and which is operable to transmit signals to and to receive signals from the HeNB-GW 15 via an HeNB-GW interface 55. The operation of the transceiver circuitry 51 is controlled by a controller 57 in accordance with software stored in memory 59. The software includes, among other things, an operating system 61, a base station registration module 63, a mobile telephone registration module 65, and a connection management module 67.

The base station registration module 63 is operable to register the HeNB with the HeNB-GW 15 and the telephone registration module 65 is operable to register the user equipment 3 with the HeNB 11 and with the HeNB-GW 15. The connection management module 67 is operable to manage the connections of mobile telephones camped on the cell of the HNB 11 and to broadcast system information relating to the cell to mobile telephones 3 in the vicinity.

On conclusion of a successful handover of a mobile telephone, the connection management module 67 of a target HeNB 11 is configured to transmit a message to inform the source HeNB to release context and resources associated with the mobile telephone. Upon receipt of this message, the mobile telephone registration module 65 is operable to release the context and resources associated with the handed over mobile telephone.

HeNB Gateway (GW)

Figure 4:
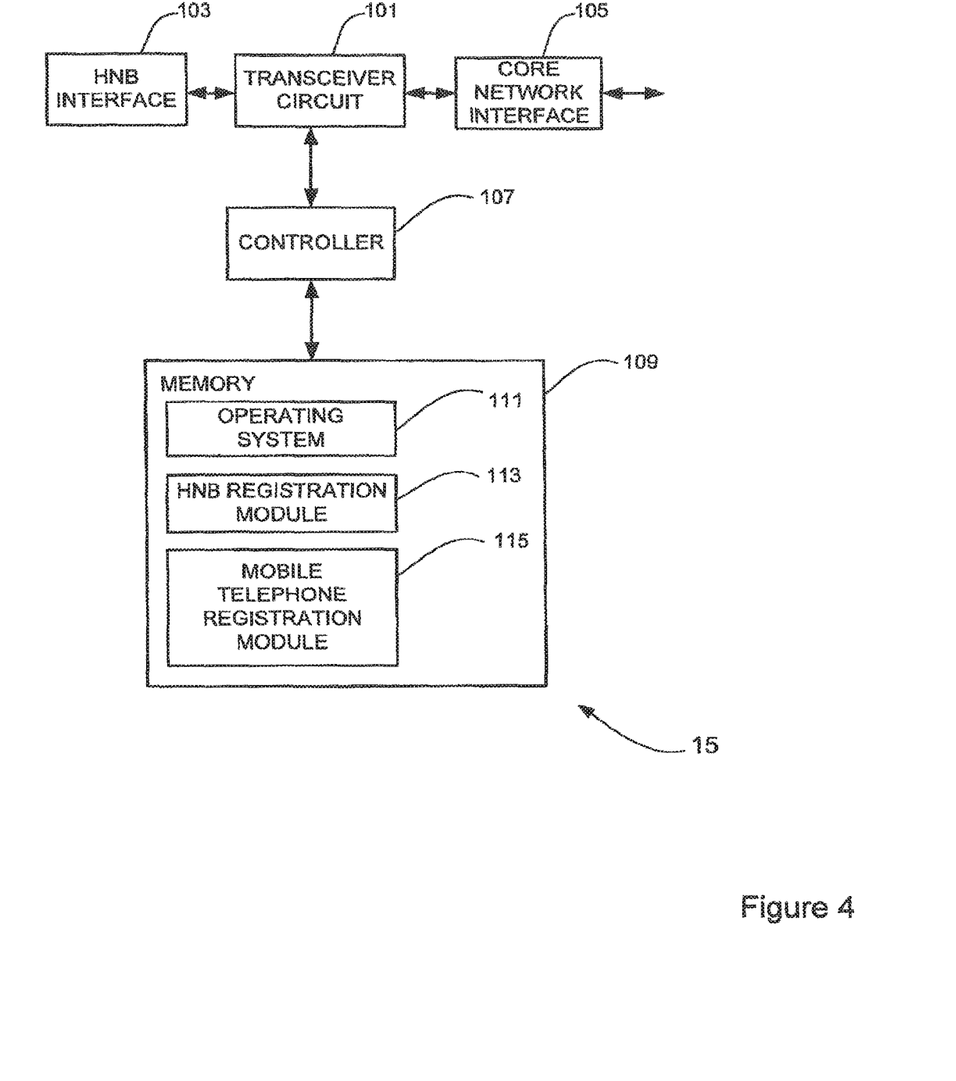
FIG. 4 is a block diagram of a home base station gateway forming part of the system shown in FIG. 1.

FIG. 4 is a block diagram illustrating the main components of the HeNB gateway (HeNB-GW) 15 shown in FIG. 1. As shown, the HeNB-GW 15 includes a transceiver circuit 101 which is operable to transmit signals to, and to receive signals from, the HeNB 11-1, 11-2 via the HeNB interface 103 and which is operable to transmit signals to and to receive signals from the MMF/S-GW 6 in the core network 8 via a core network interface 105. The operation of the transceiver circuit 101 is controlled by a controller 107 in accordance with software stored in memory 109. The software includes, among other things, an operating system 111, a HeNB registration module 113, and a mobile telephone registration module 115. The HeNB registration module 113 is operable to control the registration of HeNBs 11-1, 11-2 with the gateway and the mobile telephone registration module 115 is operable to control the registration of the user equipment 3 and to perform access control as required.

The mobile telephone registration module is further operable to receive an indication from a home base station connected to the core network 8 via the home base station gateway, that a user equipment previously connected to the base station, and therefore having a context registered at the home base station gateway, has been handed over to a target base station not coupled to the home base station gateway. In response to receiving the indication that the user equipment has been handed over, the mobile telephone registration module is operable to release the context and resources associated with the user equipment 3.

X2 Based Handover

An X2 based handover of a mobile telephone 3 between home base stations 11-2 and 11-3 illustrated in FIGS. 1, 2a, and 2b will now be described, by way of example only, with reference to the timing diagram of FIG. 5.

As those skilled in the art will appreciate, the X2 interface is the interface via which base stations communicate with each other. In an X2 based handover the handover process is coordinated between the source and target base stations without overall control by the core network 8. X2 based handover is therefore advantageous as it reduces load on the core network 8.

Figure 5:
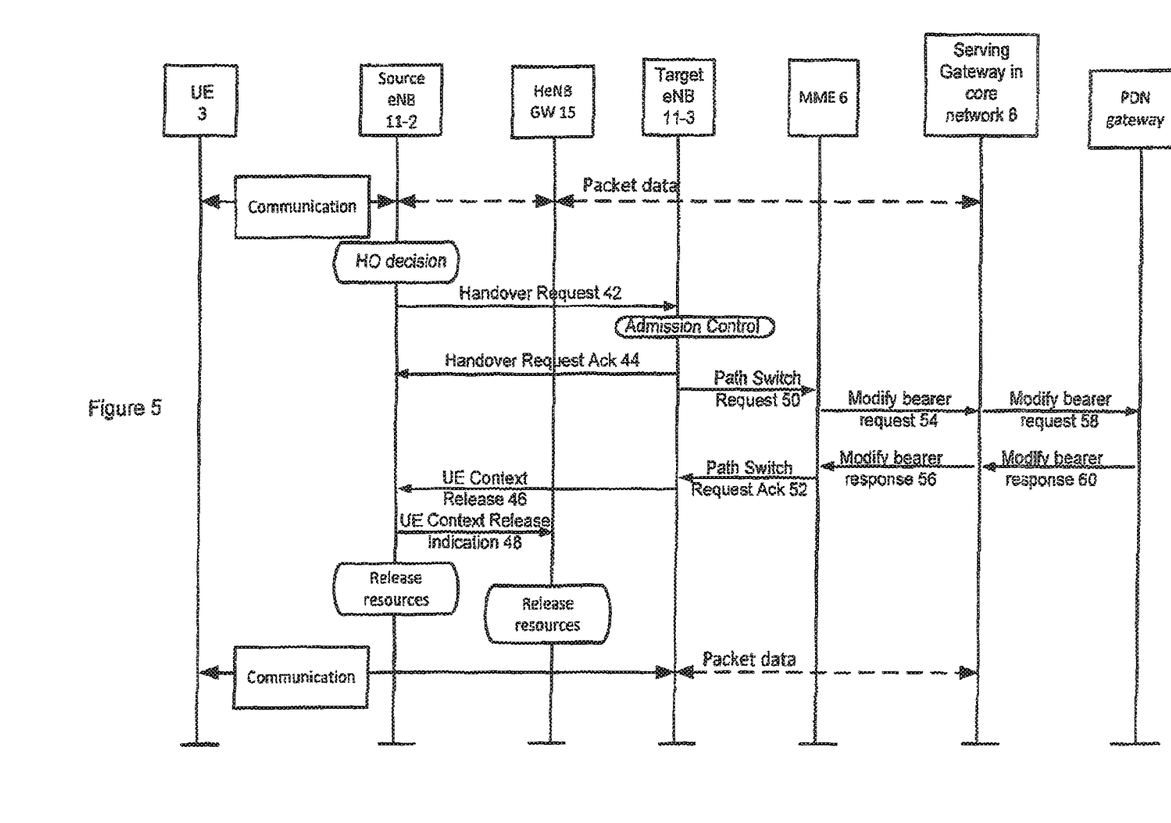
FIG. 5 is a timing diagram indicating a handover procedure by which communication with a mobile telephone is transferred between a source and target home base station.

As shown in FIG. 5, once a mobile telephone 3 establishes communication with a source HeNB 11-2 the source HeNB 11-2 relays packet data between the mobile telephone 3 and the MME/S-GW 6-1 of the core network 8 (via the HeNB-GW 15). During communication between the mobile telephone 3 and source HeNB 11-2 properties of the communication between the mobile telephone 3 and the HeNB 11-2 and other base stations are measured to assist in control of the mobile telephone's connection mobility. The HeNB 11-2 is operable to trigger the mobile telephone 3 to send a measurement report to the HeNB 11-2.

Based on the measurement report information and/or other radio resource management (RRM) information, the source HeNB 11-2 can determine whether or not to hand the mobile telephone 3 off to a target HeNB 11-3. In the event that it is determined that the mobile telephone 3 is to be handed off to a target HeNB 11-3, the source HeNB 11-2 transmits a handover request 42 to the target HeNB 11-3 which includes information necessary for the target HeNB 11-3 to prepare the handover, such as information relating to quality of service and other parameters.

The target HeNB 11-3 may perform admission control functions dependent on the received information and, if the necessary resources can be granted by the target HeNB 11-3, then the target configures the required resources to provide the required quality of service etc. Once the physical and link layer (L1 & L2) resources have been configured, the target HeNB 11-3 sends a handover request acknowledgement message 44 to the source HeNB 11-2. The handover request acknowledgement message 44 includes a transparent container to be sent to the mobile telephone as a radio resource control, RRC, message to perform the handover.

Once the source HeNB 11-2 has received the handover request acknowledgement 44, or as soon as the transmission of the handover command is initiated in the downlink, data forwarding can be performed so that data received at the source HeNB 11-2 is forwarded to the target HeNB 11-3 to be relayed to the mobile telephone 3.

The target base station 11-3 informs the MME6 in the core network 8 of the handover of the user equipment using a path switch request 50. The purpose of the path switch request procedure is to request that the downlink GTP (GPRS tunneling protocol) tunnel is directed to a GTP tunnel endpoint at the target HeNB 11-3.

An example of a path switch request message 50 is set out in Table 1. In Table 1 the following abbreviations are used: E-RAB is used to indicate the evolved UMTS Terrestrial Radio Access Network—Radio Access Bearer; IE is used to indicate an information element; GTP-TEID is used to indicate a GPRS tunneling protocol Tunnel Endpoint Identifier; E-UTRAN CGI is used to indicate the evolved UMTS Terrestrial Radio Access Network Cell Global Identity.

In response to the path switch request the MME transmits an update bearer request 54 or a create session request to the serving gateway which forms part of the MME/S-GW 6 within the core network 8 as shown in FIG. 1, which may in turn relay this request 58 to a packet data network gateway (not shown).

In the example described above with reference to FIG. 4 the source and target HeNB are served by the same serving gateway in the core network 8. In this case, as shown in FIG. 5 a modify bearer request message 54 is sent from the MME to the serving gateway and from the serving gateway to the PDN gateway. As shown in FIG. 5 these messages are acknowledged by the serving gateway and by the PDN gateway. In the example shown in FIG. 6 the source and target base stations (e.g. HeNB 11-2, 11-3) are served by different serving gateways. In this example, to perform serving gateway relocation the MME sends a create session request to the target serving gateway. The target serving gateway then sends a modify bearer request message to the PDN gateway. Once this has been done and the target base station has sent a release resource message to the source base station the MME sends a delete session request to the source serving gateway.

After the down link path is switched in the core network 8, packets destined for the mobile telephone 3 are sent to the target HeNB 11-3. The target HeNB 11-3 then sends a X2AP UE Context Release message 46 to the source HeNB 11-2, to inform the source HeNB 11-2 that the resources previously reserved at the source HeNB 11-2 for the connection to the mobile telephone can be released, although any ongoing data forwarding may continue.

As noted above, the X2AP UE Context Release message 46 is not provided to the HeNB gateway 15. Furthermore, as the target HeNB 11-3 is not connected to the core network 8 via the HeNB gateway 15, the path switch request/response message does not traverse the HeNB gateway 15. Thus, according to embodiments of the invention, the source HeNB 11-2 upon receipt of the X2AP Context Release message requests release of the UE context towards the HeNB gateway 15. Thus, a message 48 from the source HeNB 11-2 traverses the HeNB gateway 15, and provides an indication to the HeNB gateway 15 that the resources and context associated with the mobile telephone 3 can be released.

TABLE 1

| IE/Group Name | Presence | Range | Semantics description | Criticality | Assigned Criticality |
|---|---|---|---|---|---|
| Message Type | M | | | YES | reject |
| eNB UE S1AP ID | M | | | YES | reject |
| E-RAB To Be Switched in Downlink List | | 1 | | YES | reject |
| >E-RABs Switched in Downlink Item IEs | | 1 to <maxnoofE-RABs> | | EACH | reject |
| >>E-RAB ID | M | | | — | |
| >>Transport layer address | M | | | — | |
| >>GTP-TEID | M | | To deliver DL PDUs | — | |
| Source MME UE S1AP ID | M | | | YES | reject |
| E-UTRAN CGI | M | | | YES | ignore |
| TAI | M | | | YES | ignore |
| UE Security Capabilities | M | | | YES | ignore |
| Cell Access Mode | O | | | | |

Thus according to embodiments of the invention, for any hand over scenario in which a mobile station 3 is transferred from a cell associated with a source HeNB 11 coupled to the core network 8 via a HeNB gateway 15 to a cell associated with a target base station that is not coupled to the HeNB gateway 15, such as the examples shown in FIGS. 1, 2a and 2b, the source HeNB 11 provides a Context Release indication message 48 that traverses the HeNB gateway 15 and informs the gateway 15 that the context and resources associated with the mobile telephone 3 can be released.

Modifications and Alternatives

A number of detailed embodiments have been described above. As those skilled in the art will appreciate, a number of modifications and alternatives can be made to the above embodiments whilst still benefiting from the inventions embodied therein.

Figure 7:
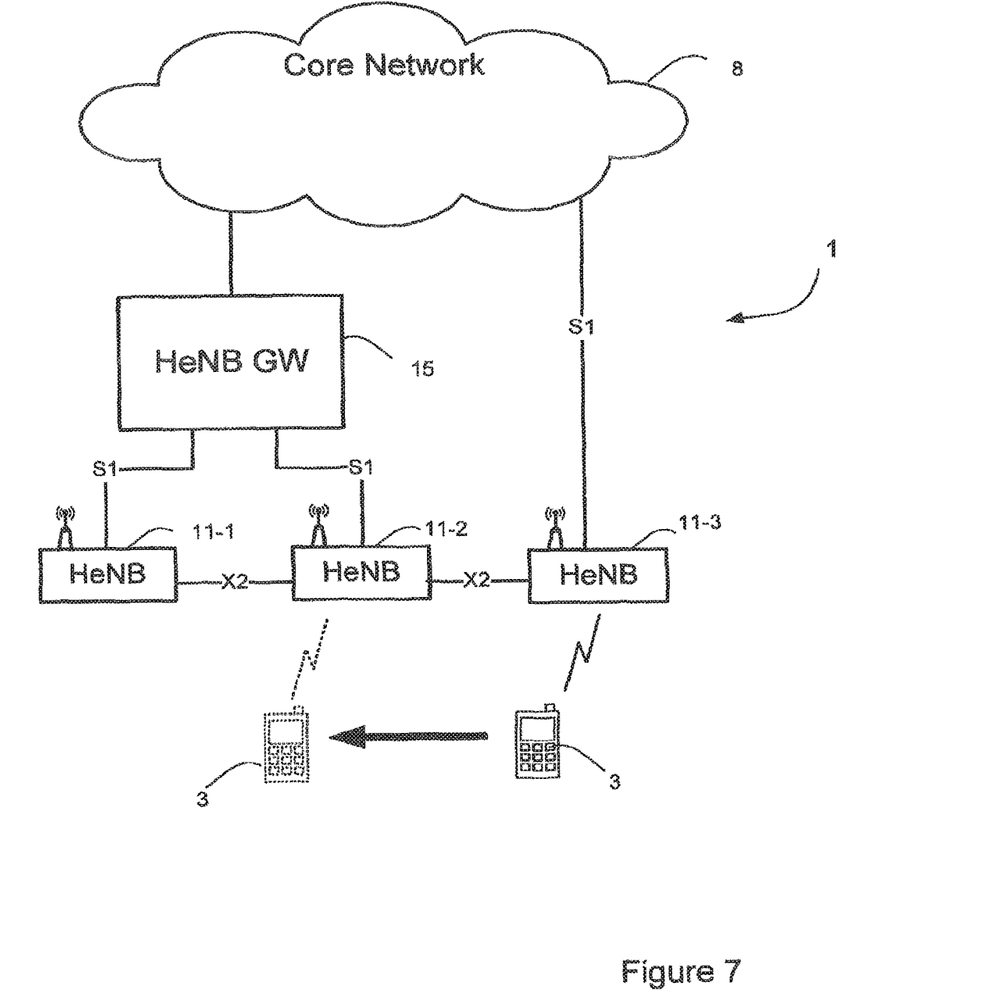
FIG. 7 schematically illustrates a further hand over scenario in the mobile telecommunication system of FIG. 1.

While the above discussion relates to the hand over of a user equipment from a source HeNB 11-2 connected to the core network 8 via the HeNB gateway, to a target HeNB 11-3 not connected via the same HeNB gateway 15, it is noted that a hand over in the reverse direction (i.e. from a base station not coupled to a HeNB gateway 15 to a target HeNB 11-2 coupled to the core network 8 via HeNB GW 15) may also lead to issues not currently addressed in the standards. An example of such a handover is shown in FIG. 7 in which mobile telephone 3 is transferred from source HeNB 11-3 to target HeNB 11-2. It will be recognized that other example transfers include situations analogous to those shown in FIGS. 2a and 2b, in which the handover occurs in the opposite direction to that shown.

Figure 8:
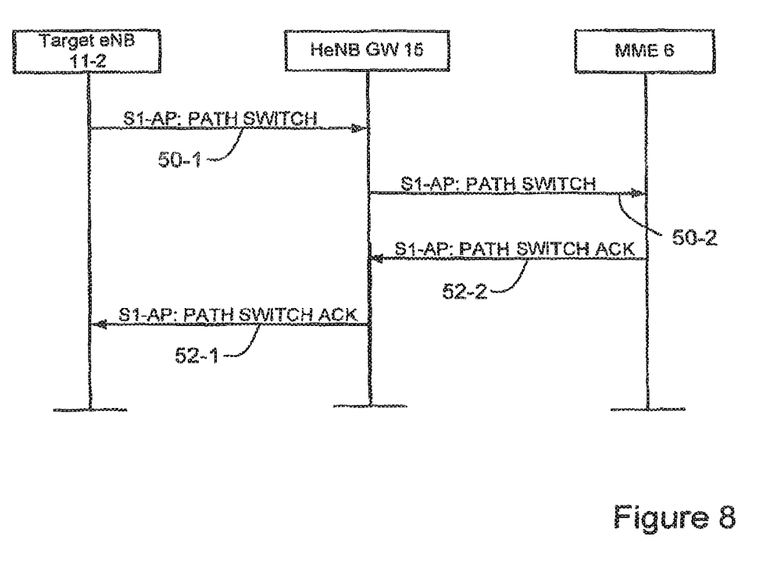
FIG. 8 is a timing diagram indicating a portion of the handover procedure of FIG. 5.

FIG. 8 illustrates the exchange of messages between a target HeNB 11-2 connected to the MME 6 of the core network 8 via a HeNB gateway 15 in order to instruct the core network 8 to switch the termination point of the connection to a mobile telephone 3 transferred to the target HeNB 11-2. As coordination of the handover to the target HeNB uses the X2 interface, the first message relating to the mobile telephone 3 that traverses the HeNB gateway 15 is the S1-AP Path Switch Request Message 50. Thus, this is the first occasion for which a UE associated signalling message for the handed over mobile telephone 3 is received at the HeNB gateway. In order to support this scenario, new functionalities may be provided in the HeNB gateway 15 according to some embodiments of the invention. In particular:

The Mobile Telephone Registration Module 115 of the HeNB gateway 15 may be further configured to allocate the UE context upon reception of the S1 Path Switch Request Message.

The HeNB gateway 15 may provide a proxy function for subsequent messages associated with the handed over UE 3 between the HeNB and the core network 8, including allocating a eNB UE S1AP ID$_{GW}$ towards the MME 6, and a MME UE S1AP IDGw towards the HeNB 11-2. The HeNB gateway will exchange the MME S1AP UE ID and eNB S1AP UE ID values between the global and as necessary according to the proxy function.

The HeNB gateway may be required to include the actual MME UE S1AP ID value in the S1AP Path Switch Acknowledgement message to the target HeNB for use in further handovers.

Furthermore, in order to support further X2 based handover procedures, the target HeNB 11-2 should store eNB UE S1AP ID and MME UE S1AP ID values associated with the mobile telephone 3 and received from the source HeNB or eNB as part of the X2 based handover procedure.

The target HeNB can then store the MME UE S1AP ID value received from the source eNB during handover for use in future handovers, while using the MME UE S1AP ID$_{GW}$ value provided by the HeNB GW 15 for all other signalling towards the HeNB GW 15 and MME 6.

Alternatively, the HeNB GW 15 may provide separate MME UE S1AP ID$_{GW}$ and MME UE S1AP ID2 values to the HeNB 11-2 associated with the mobile telephone 3. In this case, the HeNB 11-2 will store the MME UE S1AP ID2 value for use in future X2 based handover procedures.

In the above embodiments, a mobile telephone based telecommunications system was described. As those skilled in the art will appreciate, the signalling techniques described in the present application can be employed in other communications system. Other communications nodes or devices may include user equipment devices such as, for example, personal digital assistants, laptop computers, web browsers, etc.

In the embodiments described above, the mobile telephone and the HNB each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the HNB or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

The description of the handover process provided above has been given with specific reference to home NodeBs however embodiments of the invention may be applied to other base stations such as eNodeBs or RAN base stations.

While the above discussion relates to a hand over between a HeNB 11-2 coupled to a core network via a HeNB gateway 15, and a further HeNB 11-3 coupled directly to the core network, it is noted that in other embodiments of the invention, the hand over may be between two HeNBs 11 coupled to the core network via different HeNB gateways.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

INTRODUCTION

During the last RAN3 meeting (RAN3#70bis) meeting, discussion paper [1] highlighted the open issue related to X2 based mobility for HeNB. As discussed in the paper, for the certain deployment scenarios with HeNB GW, after the X2 based HO the HeNB GW will be left with hanging UE contexts and related resources. RAN3 acknowledged the issue and it was decided to discuss further and find a solution for this problem. This discussion paper analyzes the issue and proposes potential solutions.

2 DESCRIPTION

It was acknowledged that the problem will happen during the X2 HO in two cases:
 (a) The source HeNB is connected via the HeNB GW and target HeNB connected directly to the MME.
 (b) The source HeNB and target HeNB are connected to different I-IeNB GWs.

Since the source HeNB is connected behind the HeNB GW, therefore two pair of UE associated connection is established, one between HeNB and HeNB GW and another between HeNB GW and MME. The mapping of these two UE associated signalling connected for the same UE is performed by the HeNB GW. Therefore, UE context and related resources are allocated both at the HeNB and the HeNB GW.

During the X2 based HO, the target HeNB explicitly releases the UE Context at the source HeNB using the X2AP UE Context Release procedure. On the other hand, since S1AP C Plane message i.e. S1AP Path Switch Request/Response message does not transverse through the HeNB GW therefore, the HeNB GW does not have any means to understand that the UE has been handed over (via X2) to the other HeNB. As a result, the UE context information and related resources assigned by the HeNB GW will keep hanging. Three possible solutions have been discussed during the last RAN3 meeting.
 1. The source HeNB GW releases the UE context by itself
 2. The source HeNB GW releases the UE context as the request from the source HeNB
 3. The source HeNB GW releases the UE context as the command from the MME Solution 1 considered as an inadequate because this solution can possibly address (further investigation needed) the deployment scenario where HeNB GW S1-U plane transverse through the HeNB GW, noting that S1-U concentration in the HeNB GW is optional. Solution 3 can work but seen as significant changes for the MME behaviour to address only this particular use case. Therefore, it is reasonable to investigate more on the solution 2 which does not have any impact on the MME.

The basic essence of solution 2 is that source HeNB requests the release of UE context towards the HeNB GW. There are two possible options to handle this.

Option 1: Re-Use the Existing S1AP UE Context Release Request—eNB Initiated Procedure The benefit of option 1 is that there is no need to define any new procedure. On the other hand, there are some drawbacks for this solution. Firstly, this procedure is only meant to be used for abnormal cases (as per TS 36.413) and not for the normal X2 HO. secondly, additional signalling during X2HO since HeNB has to trigger the release of UE context towards the HeNB GW. Thirdly, the HeNB GW has to look every S1AP UE CONTEXT RELEASE REQUEST from the HeNB and then decide whether this message to be sent to MME (for the existing use case of this procedure) or terminate at the HeNB GW in case it is triggered due to X2 based HO. And, finally HeNB GW need to trigger UE Context Release (MME initiated) procedure (class 1) after receiving S1AP UE CONTEXT RELEASE REQUEST from the HeNB, means more signalling.

Option 2: Define a New Class 2 Procedure Along the Line of X2AP UE Context Release Indication Procedure The second easy mechanism is to define a new class 2 procedure along the line of X2AP UE Context Release procedure. The source HeNB will trigger the procedure upon reception of X2AP UE Context Release from the target HeNB. The HeNB GW behaviour in this case would be simple because the HeNB does not need to check the cause of every UE CONTEXT RELEASE REQUEST message. Of course there is disadvantage that HeNB will need to terminate UE associated signalling message which is an exception. As an alternative non UE associated signalling could be also used. Based on the above evaluation, our preference is option 2 because it requires less signalling and less HeNB/HeNB GW implementation complexity.

Proposal 1: NEC Proposes to Agree on Option 2 in Order to Resolve the UE Context Release Issue at the HeNB GW.

The necessary changes in TS 36.413 and TS 36.300 is as described below (Annex). In case of agreement, NEC is happy to provide the necessary CRs.

3 CONCLUSION AND PROPOSALS

Proposal 1: NEC Proposes to Agree on Option 2 in Order to Resolve the UE Context Release at the HeNB GW Issue.

4 REFERENCES

[1] TS 36.300 E-UTRAN stage-2
[2] R3-110108 UE Context Release in the source HeNB GW
Annex A.1

This section describes the necessary stage-2/3 changes needed in the specification.
=Changes for TS 36.413=
8. 3.x UE Context Release Indication
8. 3.x.1 General
 The UE Context Release Indication procedure is initiated by the eNB to signal to indicate the source MME that UE context shall be released.
 The procedure uses UE-associated signalling.
8. 3.x.2 Successful Operation
 The UE Context Release Indication procedure is initiated by the eNB. By sending the UE CONTEXT RELEASE INDICATION message the target eNB informs the MME of X2 Handover success and triggers the release of resources. This procedure is only triggered by the eNB if different values for MME UE S1AP ID and MME UE S1AP ID2 are assigned by the MME.
 Upon reception of the UE CONTEXT RELEASE message, the MME may release UE Context and related resources associated to the UE context.
8. 3.x.3 Unsuccessful Operation
 Not applicable.
8. 3.x.4 Abnormal Conditions
 Not applicable.
Next Change
9.1.1.5 UE Context Release Indication
 This message is sent by the eNB to the MME to indicate that resources can be released.
 Direction: eNB→MME.

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB UE S1AP ID | M | | eNB UE X2AP ID 9.2.24 | Allocated at the source eNB | YES | reject |
| MME UE S1AP ID | M | | eNB UE X2AP ID 9.2.24 | Allocated at the target eNB | YES | reject |

=Changes for TS 36.300=
4.6.2 Functional Split

The HeNB hosts the same functions as an eNB as described in section 4.1, with the following additional specifications in case of connection to the HeNB GW:

Discovery of a suitable Serving HeNB GW;
A HeNB shall only connect to a single HeNB GW at one time, namely no S1 Flex function shall be used at the HeNB:
The HeNB will not simultaneously connect to another HeNB GW, or another MME.
The TAC and PLMN ID used by the HeNB shall also be supported by the HeNB GW;
Selection of an MME at UE attachment is hosted by the HeNB GW instead of the HeNB;
HeNBs may be deployed without network planning. A HeNB may be moved from one geographical area to another and therefore it may need to connect to different HeNB GWs depending on its location.
On completion of X2 HO, release of UE Context and triggering the UE Context Release procedure.
Regardless of HeNB GW Connection:
The HeNB may support the LIPA function. See section 4.6.5 for details.
The HeNB GW hosts the following functions:
Relaying UE-associated S1 application part messages between the MME serving the UE and the HeNB serving the UE;
Terminating non-UE associated S1 application part procedures towards the HeNB and towards the MME. Note that when a HeNB GW is deployed, non-UE associated procedures shall be run between HeNBs and the HeNB (W and between the HeNB GW and the MME.
Optionally terminating S1-U interface with the HeNB and with the S-GW.
Supporting TAC and PLMN ID used by the HeNB.
X2 interfaces shall not be established between the HeNB GW and other nodes.

Termination of the UE Context Release procedure and releasing the UE Context based on the indication from the HeNB.
A list of CSG IDs may be included in the PAGING message. If included, the HeNB GW may use the list of CSG IDs for paging optimization.
In addition to functions specified in section 4.1, the MME hosts the following functions:
Access control for UEs that are members of Closed Subscriber Groups (CSG):
In case of handovers to CSG cells, access control is based on the target CSG ID provided to the MME by the serving E-UTRAN.
Membership Verification for UEs handing over to hybrid cells:
In case of handovers to hybrid cells Membership Verification is triggered by the presence of the Cell Access Mode and it is based on the target CSG ID provided to the MME by the serving E-UTRAN.
CSG membership status signalling to the target E-UTRAN in case of attachment/handover to hybrid cells and in case of the change of membership status when a UE is served by a CSG cell or a hybrid cell.
Supervising the eNB action after the change in the membership status of a UE.
Routing of handover messages and MME configuration transfer messages towards HeNB GWs based on the TAI contained in these messages.
NOTE: The MME or HeNB GW should not include the list of CSG IDs for paging when sending the paging message directly to an un-trusted HeNB or eNB.
The MME may support the LIPA function with HeNB. See details of this support in section 4.6.5.

Annex A.2
9.1.5.9 Path Switch Request Acknowledge

This message is sent by the MME to inform the eNB that the path switch has been successfully completed in the EPC.
Direction: MME→eNB.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| UE Aggregate Maximum Bit Rate | O | | 9.2.1.20 | | YES | ignore |
| E-RAB To Be Switched in Uplink List | | 0 ... 1 | | | YES | ignore |
| >E-RABs Switched in Uplink Item IEs | | 1 to <maxnoofE-RABs> | | | EACH | ignore |
| >>E-RAB ID | M | | 9.2.1.2 | | — | |
| >>Transport Layer Address | M | | 9.2.2.1 | | — | |

| IE/Group Name | Presence | Range | IE type and reference | Semantics description | Criticality | Assigned Criticality |
| --- | --- | --- | --- | --- | --- | --- |
| >>GTP-TEID | M | | 9.2.2.2 | | — | |
| E-RAB To Be Released List | O | | E-RAB List 9.2.1.36 | a value for E-RAB ID shall only be present once in E-RAB To Be Switched in Uplink List IE + E-RAB to Be Released List IE | YES | ignore |
| Security Context | M | | 9.2.1.26 | One pair of {NCC, NH} is provided | YES | reject |
| Criticality Diagnostics | O | | 9.2.1.21 | | YES | ignore |
| MME UE S1AP ID 2 | O | | 9.2.3.3 | This IE indicates the MME UE S1AP ID assigned by the MME | YES | reject |

| Range bound | Explanation |
| --- | --- |
| maxnoofE-RABs | Maximum no. of E-RABs for one UE. Value is 256. |

This application is based upon and claims the benefit of priority from United Kingdom patent application No. 1102883.4, filed on Feb. 18, 2011, the disclosure of which is incorporated herein in its entirety by reference.

What is claimed is:

1. A method performed by a target base station, the method comprising:
receiving, from a source base station, a handover request initiating handover of a mobile device from the source base station to the target base station, via an X2 interface between the source base station and the target base station; and
sending, to the source base station, through the X2 interface, a UE Context Release message from the target base station to inform the source base station of successful handover and indicating that resources related to context associated with the mobile device are allowed to be released, wherein the UE Context Release message comprises information, allocated at the target base station, identifying the mobile device;
wherein, when the source base station is connected to a base station gateway, the source base station sends a message to the base station gateway in order to indicate that the base station gateway may release the resources related to a context associated with the mobile device.

2. A target base station comprising:
a processor; and
a transceiver circuit,
wherein the processor is configured to control the transceiver circuit to:
receive, from a source base station, a handover request initiating handover of a mobile device from the source base station to the target base station, via an X2 interface between the source base station and the target base station; and
send, to the source base station, through the X2 interface, a UE Context Release message from the target base station to inform the source base station of successful handover and indicating that resources related to context associated with the mobile device are allowed to be released, the UE Context Release message including information, allocated at the target base station, identifying the mobile device;
wherein, when the source base station is connected to a base station gateway, the source base station sends a message to the base station gateway in order to indicate that the base station gateway may release the resources related to a context associated with the mobile device.

* * * * *

UNITED STATES PATENT AND TRADEMARK OFFICE
CERTIFICATE OF CORRECTION

PATENT NO. : 10,356,665 B2
APPLICATION NO. : 15/988366
DATED : July 16, 2019
INVENTOR(S) : Vivek Jha Page 1 of 1

It is certified that error appears in the above-identified patent and that said Letters Patent is hereby corrected as shown below:

On the Title Page

Column 1, Title, Line 3; After "DEVICE", insert --¶CROSS-REFERENCE TO RELATED APPLICATIONS
This application is a Continuation of U.S. Application No. 15/495,000 filed Apr. 24, 2017, which is a Continuation of U.S. Application No. 13/818,090 filed Feb. 20, 2013, which issued as Patent No. 9,668,181 on May 30, 2017, which is a National Stage of International Application No. PCT/JP2012/054177 filed Feb. 15, 2012, and claims priority from United Kingdom Patent Application No. 1102883.4 filed Feb. 18, 2011, the disclosures of which are
incorporated by reference herein in their entirety.--

In the Specification

Column 6, Detailed Description of Exemplary Embodiments, Line 26; Delete "MMF/S-GW" and insert --MME/S-GW-- therefor Column 9, Detailed Description of Exemplary Embodiments, Line 59; Delete "IDGw" and insert --$ID_{GW}$-- therefor Column 11, Detailed Description of Exemplary Embodiments, Line 17; Delete "I-IeNB" and insert --HeNB-- therefor Column 13, Detailed Description of Exemplary Embodiments, Line 44; Delete "(W" and insert --GW-- therefor Signed and Sealed this
Fifth Day of November, 2019

Andrei Iancu
*Director of the United States Patent and Trademark Office*